Figures 1, 2:
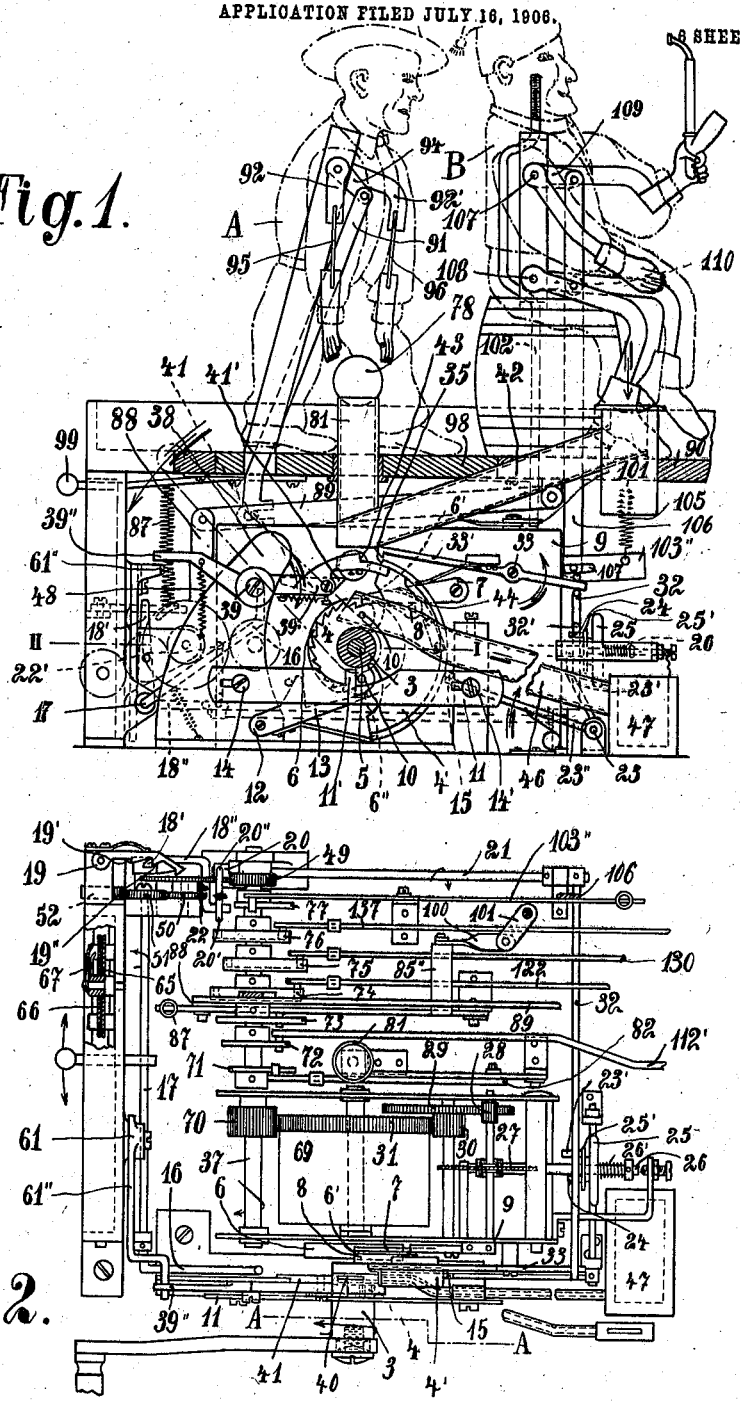

No. 866,923. PATENTED SEPT. 24, 1907.
O. EICHENBERGER.
APPARATUS FOR IMITATING THE GAME OF SKITTLES BY MEANS OF AUTOMATA.
APPLICATION FILED JULY 16, 1906.

6 SHEETS—SHEET 1.

Witnesses

Inventor
Otto Eichenberger
by his Attorney

No. 866,923. PATENTED SEPT. 24, 1907.
O. EICHENBERGER.
APPARATUS FOR IMITATING THE GAME OF SKITTLES BY MEANS OF AUTOMATA.
APPLICATION FILED JULY 16, 1906.
6 SHEETS—SHEET 2.
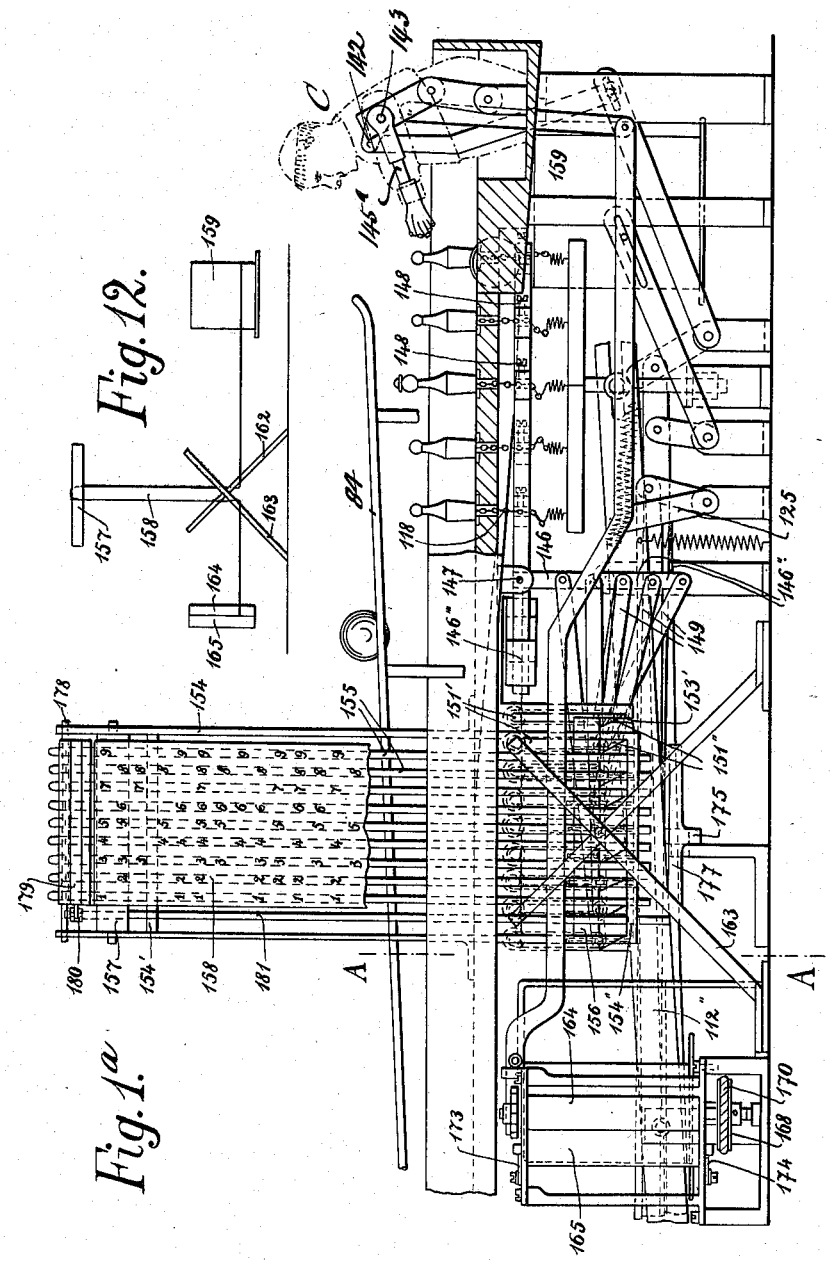
Witnesses
Inventor
Otto Eichenberger
by his Attorney No. 866,923. PATENTED SEPT. 24, 1907.
O. EICHENBERGER.
APPARATUS FOR IMITATING THE GAME OF SKITTLES BY MEANS
OF AUTOMATA.
APPLICATION FILED JULY 16, 1906.
6 SHEETS—SHEET 3.
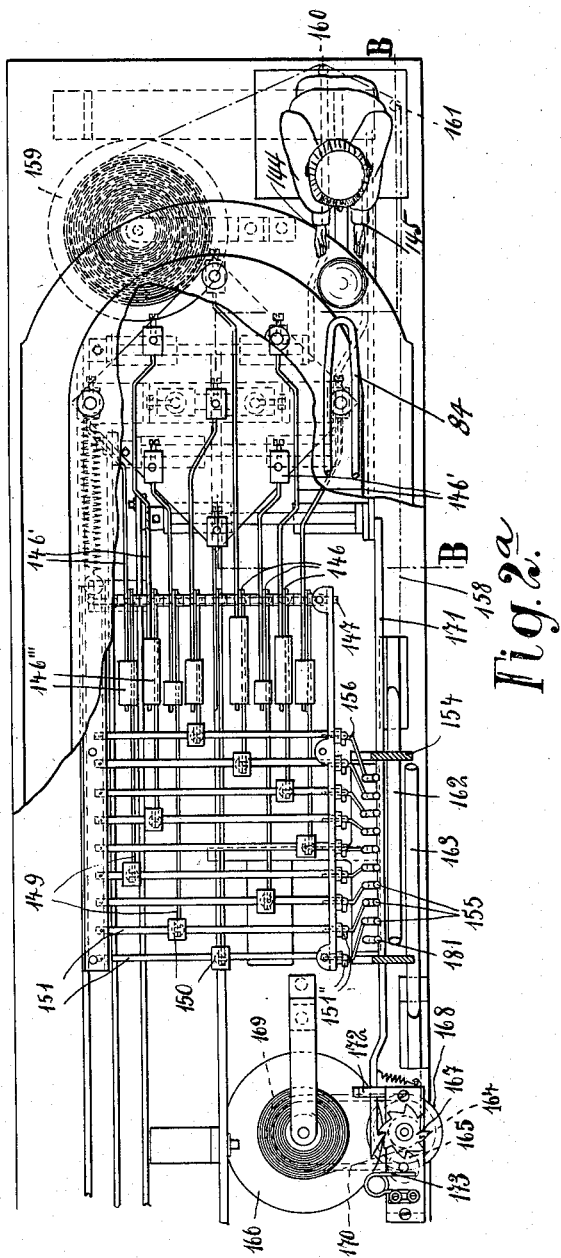
Fig. 2ª
Witnesses
Inventor
Otto Eichenberger
by his Attorney

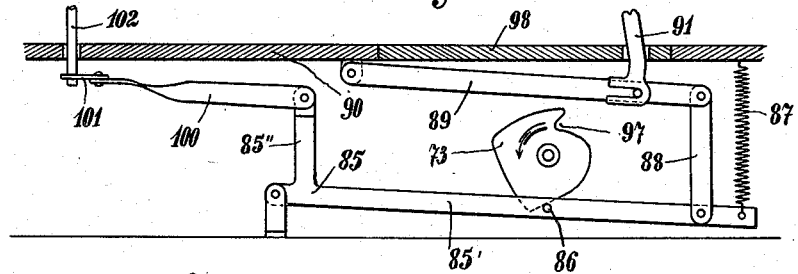

No. 866,923. PATENTED SEPT. 24, 1907.
O. EICHENBERGER.
APPARATUS FOR IMITATING THE GAME OF SKITTLES BY MEANS OF AUTOMATA.
APPLICATION FILED JULY 16, 1906.
6 SHEETS—SHEET 5.
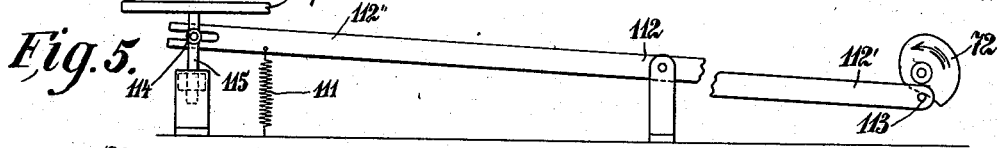
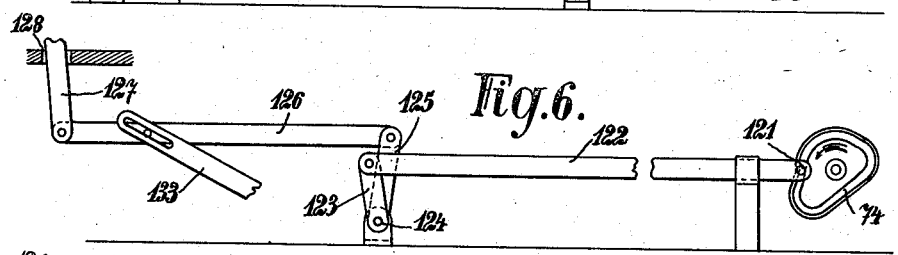
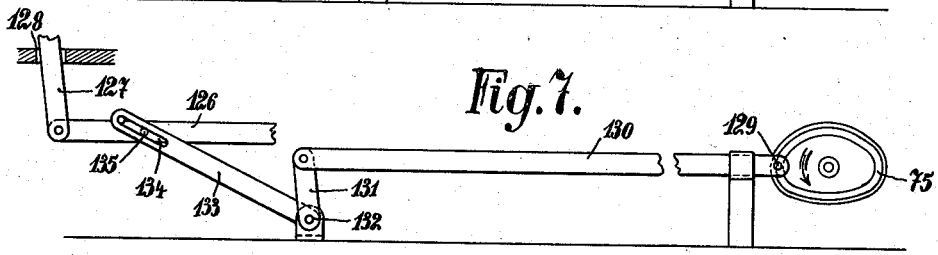
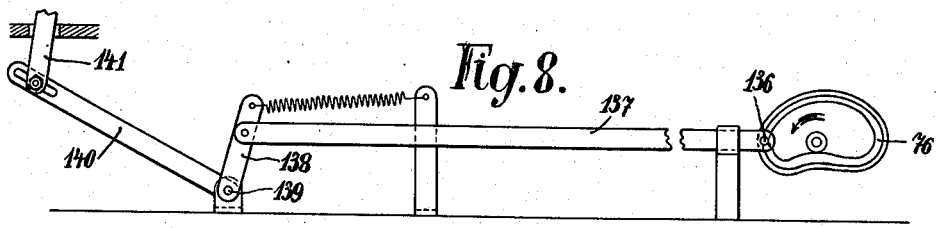
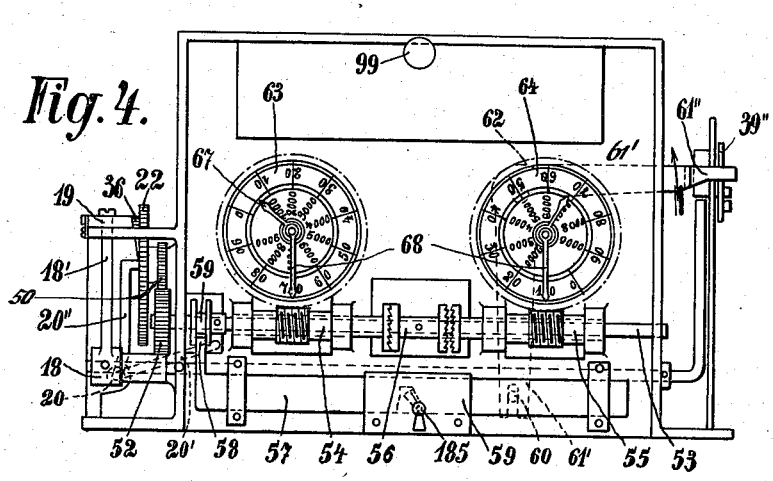
Witnesses
Inventor
Otto Eichenberger
by his Attorney No. 866,923. PATENTED SEPT. 24, 1907.
O. EICHENBERGER.
APPARATUS FOR IMITATING THE GAME OF SKITTLES BY MEANS
OF AUTOMATA.
APPLICATION FILED JULY 16, 1906.

6 SHEETS—SHEET 6.

Witnesses
Inventor
Otto Eichenberger
by his Attorney

UNITED STATES PATENT OFFICE.

OTTO EICHENBERGER, OF GENEVA, SWITZERLAND, ASSIGNOR OF ONE-HALF TO LEON BROCK, OF NEW YORK, N. Y.

APPARATUS FOR IMITATING THE GAME OF SKITTLES BY MEANS OF AUTOMATA.

No. 866,923.     Specification of Letters Patent.     Patented Sept. 24, 1907.

Application filed July 16, 1906. Serial No. 326,422.

*To all whom it may concern:*

Be it known that I, OTTO EICHENBERGER, a citizen of the Swiss Republic, residing at Geneva, Switzerland, have invented certain new or Improved Apparatus for Imitating the Game of Skittles by Means of Automata, of which the following is a specification.

This invention relates to apparatus for imitating the game of skittles by means of automata.

The apparatus comprises a shaft adapted to be driven by a motor and to operate counting mechanism which registers the results of the game, the said motor being provided with a device by means of which it can be started and stopped at will. Cams fixed to the driving-shaft control, by means of suitable mechanism, automata, one of which is adapted to throw a ball towards the skittles, whereupon another automaton lifts the said ball and places it in an inclined trough down which the ball travels towards the automaton acting as thrower or player. A cam on the driving shaft is connected by means of levers with a plate located below the board or the like supporting the skittles, the said plate being connected to the skittles by means of springs and flexible devices which allow of setting up the skittles knocked over by the ball. The flexible devices connecting the skittles with the said plate are connected with a device by means of which the number of the skittles knocked over is indicated after each throw of the ball.

The invention is illustrated in the annexed drawing in which

Figure 13:
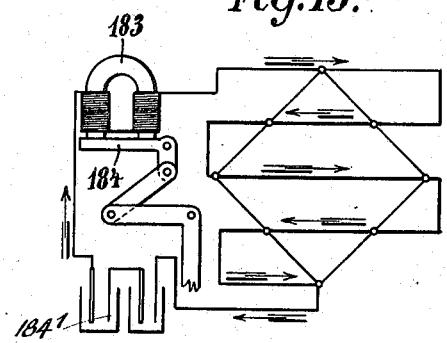
Figure 14:
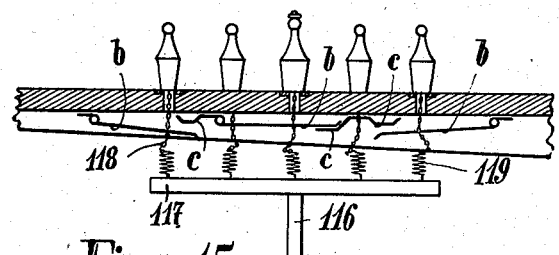
Figure 15:
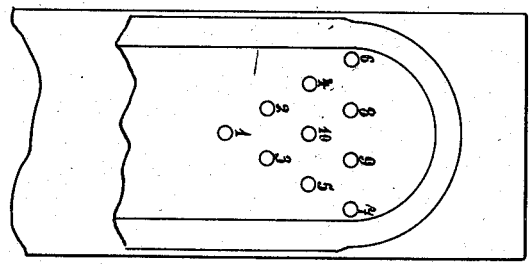

Figure 1 is a fragmentary longitudinal section of one end of the apparatus. Fig. 1ª is a view partly in section and partly in elevation illustrating the portion of the apparatus omitted in Fig. 1. Fig. 2 a plan view thereof, in partial section. Fig. 2ª is a view partly in top plan and partly in section of that portion of the apparatus illustrated in Fig. 1ª. Fig. 3 a section on the line A—A of Fig. 1, and Fig. 4 a view of the counting mechanism. Figs. 5 to 14 illustrate details of the apparatus. Fig. 15 illustrates the arrangement of the skittles.

The motor serving for operating the apaparatus illustrated is a spring motor. The crank 1 is fixed to the hub 3 of the segments 4 and $4^1$ so that by turning the crank the parts 4, $4^1$ are moved. To the axle 5, on which the segments 4 and $4^1$ are loosely mounted, is fixed a ratchet wheel 6 provided with two abutments $6^1$, $6^{11}$.

The ratchet-wheel 6 is engaged by two pawls 7, 8, the pawl 7 being connected with the spring-barrel 9 of the motor and the pawl 8 being connected with the segment $4^1$. Owing to the fact that the pawl 8 is connected with the segment $4^1$, the ratchet wheel 6 is operated by the rotation of the crank 1, and the segment $4^1$ is also rotated until the pawl 7 engages the abutment $6^{11}$. Since the ratchet wheel 6 on the shaft 5 is connected by the latter with the driving spring, the said spring is tensioned by the rotation of the shaft. By turning the crank 1 in the direction indicated by the arrow in Fig. 2 a pin 10 fixed to the segment 4 is caused, after a semi-revolution of the crank to abut against a projection $11^1$ on the rod 11 and to displace the latter towards the right. Thereupon the crank is rotated in the reverse direction through 180 degrees so that the pin $10^1$ again abutting against the projection $11^1$ of the rod 11 moves the latter back to the position shown in Fig. 1. The displacement of the rod 11 towards the right causes the pawl 13 to be disengaged from the segment 4 by a pin 12 fixed to the said rod so that the subsequent rotation of the crank in the opposite direction can take place.

For starting and stopping the motor the following mechanism is provided. To the segment $4^1$ is fixed the pin 15 which operates the lever 16 when the crank and segment $4^1$ are rotated. The lever 16 is fixed to one end of the shaft 17 and to the other end of the latter a bell-crank lever 18 (Fig. 4) is fixed. The arm $18^1$ of this bell-crank lever 18 is connected with the pawl 19. By the movement of the lever 16 the shaft 17 and bell-crank lever 18 are moved in the direction indicated by the arrow in Fig. 2. By this means the arm $18^1$ is moved into engagement with the abutment $19^1$ of the pawl 19. The doubly-bent lever arm $18^{11}$ abuts against the lever arm $20^1$ of the bell-crank lever 20 and causes, during its further rotation, a rotation of the shaft 21 in the direction indicated in Fig. 2. The arm $20^1$ of the bell-crank lever 20 which engages a recess $22^1$ in the toothed wheel 22, is by the rotation of the shaft 21 disengaged from this toothed wheel. This disengagement of the toothed wheel 22 takes place at the end of the crank movement through 180 degrees. The driving mechanism would thereupon begin to move the arm $23^1$ if the bell-crank lever 23 did not prevent its movement.

Before the tensioning of the motor spring the crank 1 occupies the position indicated in Fig. 1 by the numeral I; from this position it is rotated into the position indicated by the numeral II, and thence back to the position I, the movement being similar to that of the lever of a ratchet-brace. When the crank 1 is moved into the position I the lever-arm 23 is so operated by the pin 15 that the lever-arm $23^1$ is removed from the pin 24 fixed to the front of the disk $25^1$ keyed to the worm-shaft 26.

The small fly wheel 25 is loosely mounted on the said worm-shaft 26 and is pressed by a spring $26^1$ against the disk $25^1$ so that it rotates with the latter when the worm-shaft 26 is driven by means of the worm-wheel 27 and the toothed gear 28, 29 and 30, 31, connected with the motor. The purpose of the bell-crank lever 23 is to prevent the movement of the motor during the rotation of the crank 1. In order to prevent the movement of the crank during the movement of the motor the following device is provided: With the shaft 21 is connected the lever 32 the free end of which forms a fork engaged by the double-armed lever 33. The arm 33¹ of the lever 33 is provided at its free end with a projection. During the rotation of the shaft 21 in the direction indicated in Fig. 2 by arrows the lever 33 is so operated that the lever-arm 33¹ moves downwards and abuts against the segment 4¹, this action taking place at the end of the rotation of the crank into position II. During the return-movement of the crank 1 into the position I the segment 4¹ is also rotated, since it is connected with the crank, and the lever arm 33¹ slides on the periphery of the segment 4¹ until the projection fixed to the said arm engages the recess 35 in the segment. Thereupon the toothed-wheel 22 is driven by means of the spring-motor and the shaft 37 and intermediate gear so that on the running down of the spring the projection 36 of the toothed wheel 22 operates the pawl 19 in such a manner that the arm 18¹ of the angle-lever 18 is moved from the recess 19¹ into the recess 19¹¹ and the shafts 17 and 21 rotate in the direction opposite to that indicated by the arrows in Fig. 2. The lever 32 therefore moves downwards and engages the lever 33, so that the projecting part of the lever-arm 33¹ is removed from the recess 35 in the segment 4¹. The lever 32 is also provided with an abutment 32¹ which then engages the pin 24 and prevents further rotation of the disk 25¹ and motor.

The driving mechanism is so constructed that it can be wound up after the insertion of a coin or without such insertion.

For winding up the mechanism by means of a coin the following arrangement is provided. To the support 38 is connected a double armed lever 39 the arm 39¹ of which is provided with a slot 40 for the passage of the coin. To the lever-arm 39¹ there is pivotally connected a small lever 41 provided with a projection 41¹ which extends below the slot 40 for the insertion of the coin. This projection 41¹ serves for stopping the coin which is inserted into the chute 42 and passes to the slot 40 in the lever-arm 39¹. The latter is provided with a shoulder 43. If the crank 1 and segment 4¹ are operated without the previous insertion of the coin the shoulder 43 abuts against the notch 35 of the segment 4¹ and prevents the rotation of the latter. The passage of the surface 44 of the segment over the circular circumference of the coin causes the lever-arm 30¹ to be depressed in such a manner as to permit the rotation of the segment 4¹. After the rotation of the segment 4¹ through a small angle the surface 44 comes into contact with the lever 41 and depresses the latter so that the projection 41¹ of the said lever is removed from the slot 40 and releases the coin which thereupon descends through the chute 46 and passes into the cash box 47. The spring 48 retains the double armed lever 39 in the position shown in Fig. 1, the free end of the lever arm 39¹ abutting against the surface 44 of the segment 4¹.

The counting mechanism which registers the results of the game is illustrated in Fig. 4. This counting mechanism is operated by the shaft 37 and toothed gear wheels 49, 22 50, 51 and 52. The toothed wheel 52 is fixed to the shaft 53 on which two worms 54, 55 are rotatable. These two worms can be coupled alternatively with the shaft 53 by means of a clutch 56 so as to be rotated by the said shaft. The displacement of the shaft 53 with the clutch 56 for the purpose of coupling said shaft with either of the worms is effected by means of a bar 57 which engages, by means of an arm 58, a slide-ring 59 fixed to the shaft. The bar 57 forms the bolt of an ordinary lock, and is provided with a pin 60 which engages the bifurcated end of the arm 61¹ of the bell-crank lever 61. The displacement of the bar 57 towards the right (Fig. 4) causes the lever 61 to rotate about its fulcrum 62 so that the arm 61¹¹ and with it the arm 39¹ of the lever 39 are moved upwards. By this means the lever-arm 39¹ is moved into the position which it occupies when the driving mechanism is to be wound up without the insertion of a coin. Fig. 4 illustrates the position of the parts when the winding up is to be effected by means of a coin. 63 and 64 are counting wheels of which the former serves for registering when the winding up of the driving mechanism is effected by means of a coin; and the latter for registering when the winding up is effected without a coin. Each of the said wheels is provided with the worm 54, or 55, and each of the said worms meshes with two worm-wheels 64 and 65 arranged one behind the other. The rear wheel 65 has 101 tooth and the front wheel 66 which also serves as a dial has 100 teeth, so that while the front wheel makes one complete revolution the rear wheel only makes approximately 99/100 of a revolution. With the worm-wheel 65 is connected the shorter hand or pointer 67, the longer hand or pointer 68 being fixed to the non-rotatable axle of the said worm-wheel. The front worm-wheel forming the dial is provided with two concentric scales the outer scale having 100 divisions and the inner scale 10,000 divisions. The counting mechanism is therefore adapted to register up to 10,000. The toothed wheel 31 fixed to the spring barrel 69 engages the pinion 70 fixed to the shaft 37.

In the shaft 37 are arranged seven cams 71, 72, 73, 74 75, 76 and 77. The cam 71 is adapted to operate mechanism which places a ball 78 between the hands of the automaton A representing the skittle-player. This mechanism comprises the bell-crank lever 79 (Fig. 11) the arm 79¹ of which forms at its free end a fork which engages a pin 80 fixed on the rod of the piston 81. The upper end of this piston is adapted to support a ball. The lever-arm 79¹¹ is connected with one end of a rod 82, the other end of the said rod making contact with the circumference of the cam 71 by means of a pin 83. The weight of the piston 81 which bears upon the lever arm 79¹ insures continuous contact between the pin 83 and the cam 71.

By each revolution of the cam the piston is lifted from its lowest to its highest position and then allowed to return to the former. The piston 81 is arranged at the end of the path 84 along which the balls return from the end of the alley to the automaton A.

The cam 73 is adapted to operate the bell-crank lever 85 by means of the pin 86 fixed to the lever-arm 85¹.

This pin is pressed against the circumference of the cam 73 by the spring 87. With the lever-arm 85¹ are pivotally connected the rods 88 and 89, the rod 89 being pivotally connected to the floor 90 of the skittle-alley. The link 91 extends from the rod 89 into the interior of the automaton A, and the arms 92, 92¹ of the latter are fixed to the shaft 93. To the same shaft is fixed the lever 94 which is pivotally connected with the rod 91. Between the upper and lower members of the arms 92, 92¹ flat-springs 95 96 are provided in order that the ball pushed by the rod 81 between the hands of the automaton A may be retained by the said hands. By the action of the mechanism operating the automaton A the arms of the latter are swung backwards and forwards while the other parts of the figure remain motionless.

The cam 73 is provided with a notch 97 which causes the swinging-movement of the arms of the automaton A to be suddenly interrupted so that the ball supported by the said arms is projected onto the skittle-alley and rolls towards the skittles.

In order to allow of slightly altering the direction in which the ball is thrown the automaton A is supported upon the small turn-table 98, the rotational axis of the latter being in line with the axis of the piston 81. The turn-table is provided with the arm 99 by means of which the automaton A can be rotated through the desired angle about its longitudinal axis.

The lever-arm 85¹¹ is pivotally connected with the rod 100 and the latter is connected to the lever 101 (Figs. 2 and 9) fixed to the shaft 102 which extends into the head of the automaton B. By the rotation of the cam 73 the rod 100 connected with the bell-crank lever 85, the lever 101, and the rod 102 are operated and the head of the automaton B is by this means turned to and fro. The movement of the arms and legs of said automaton B is produced by means of the cam 77 (Fig. 10). The double armed lever 103 is supported in such a manner that the pin 104 fixed to the free end of the lever-arm 103¹ is pressed against the circumference of the cam 77 by the spring 105 acting upon the lever-arm 103¹¹. From the lever 103 a rod 106 (Figs. 1 and 10) which engages the slot 107 in said lever by means of a pin, extends into the interior of the automaton B. The arms and legs of the automaton B are fixed to shafts 107 and 108 respectively. To these shafts the two levers 109 and 110 are fixed, the said levers being movably connected with the rod 106. By the rotation of the cam 77 the above described mechanism is caused to produce the upward and downward movement of the arms and legs of the automaton B.

The setting up of the skittles is effected by means of the cam 72 (Figs. 2 and 5). The spring 111 presses a pin 113 fixed to the free end of the arm 112¹ of the double-armed lever 112 against the circumference of the cam 72.

The bifurcated end of the said arm 112¹¹ engages the cross-bar 114 to which the two rods 115 and 116 (Fig. 2) are fixed, the said rod supporting the plate 117 (Figs 1 and 5). By means of the double armed lever 112 this plate 117 can be raised and lowered. The plate 117 is located directly below the skittles. At the position provided for each skittle a hole is made in the alley, and through the said hole passes a chain 118 attached on the one hand to the under-surface of the respective skittle and on the other hand to a spring 119 fixed to the plate 117.

The springs 119 produce an elastic connection of the skittles in the plate 117. As shown in Fig. 1 the skittles after being set up are loosely connected with the plate 117 so that the chains between the skittles and the plate 117 allow of knocking over the skittles.

The setting up of the skittles is effected by means of a recess in the cam 72, which causes the plate 117 to be pulled downwards by the lever 112 with a short, rapid movement. By this means the chains are stretched and the springs are partially bent so that the skittles are erected. The surface of the cam 72 is so shaped that after the chains have been pulled by the plate 117 and the skittles have been erected a slow upward movement of the said plate takes place so that there is no tendency for the skittles to fall down again.

The automaton C serves to return the balls to the "player" A. A groove 120 for the reception of the thrown balls extends round the alley, the lowest part of this groove being directly in front of the automaton C so that the balls entering the groove roll towards this automaton. The latter is operated by the cams 74, 75 and 76. The cam 74 imparts, by means of mechanism hereinafter described a forward and backward swinging movement to the automaton, the fulcrum about which the latter oscillates being at $a$ (Fig. 1). The cam 74 (Fig. 6) engages the pin 121 fixed to one end of the rod 122. The other end of this rod is connected with the lever 123 fixed to the shaft 124. To the same shaft is fixed the lever 125 to which is connected the rod 126. From this rod 126 the link 127 extends through the slot 128 into the interior of the automaton C. When operated by means of the rod 126 the link 127 acts as a double armed lever with its fulcrum at $a$. The cam 75 serves to produce a bending movement of the upper part of the body of the automaton C. The mechanism which is connected with this cam 75 comprises parts 129 130, 131 and 132 similar to the parts 121, 122, 123, and 124 connected with the cam 74. To the shaft 132 is fixed the lever 133 provided at its free end with the slot 134 which engages the pin 135 the latter being fixed to the rod 126. By the rotation of the cam 75 the rod 126 is moved upwards and downwards and by this means a reciprocating movement of the upper part of the body of the automaton C is obtained.

The cam 76 produces by its connection with the automaton C an upward and downward movement of the arms of the latter. The mechanism which connects the cam 76 with the automaton C comprises parts 136, 137, 138, 139 and 140 similar to those described with reference to Fig 7. The lever 140 is connected to the rod 141 which is connected with the lever 142 fixed to the shaft 143. To the shaft 143 are also fixed the arms 144, 145. Between the upper and lower member of each arm of the automaton C flat springs are arranged as in the case of the automaton A, and for the same purpose. The cams 74, 75 and 76 actuate by their rotation the mechanism connected with the automaton C and thus cause the latter to stoop for the purpose of raising the ball, to thereupon assume an upright position and move the upper part of the body forward and place the ball into the trough 130

84. After having placed the ball into the said trough the hands of the automaton. C slide laterally downwards from the ball.

Each revolution of the shaft 37 causes the automata to perform the movements described.

The toothed wheel 22, which engages the stopping mechanism has twice as many teeth as the toothed wheel 49 on the shaft 37 so that the automata perform the said movements twice before the stopping mechanism acts on the motor. With the motor there is also connected mechanism which indicates the number of skittles knocked over by the ball. For each skittle there is provided a bell-crank lever 146 and the levers 146 are rotatable about the shaft 147. The chains 118 attached to the skittles pass through holes in the lever-arms $146^1$ and are retained in these holes by screws 148, the lever-arms $146^1$ are prolonged beyond their fulcra on the shaft 147 and carry balance-weights $146^{111}$; the lever-arms $146^{11}$ of the bell-crank lever 146 are pivotally connected with the rods 149. The latter are pivotally connected with the free ends of the single-armed levers 150, each of the latter being fixed to one of the shafts 151. The shafts 151 are rotatably mounted at one end in the bracket 152 and at the other end in the rectangularly bent plate 153, the said bracket and plate being fixed to the under-surface of the floor of the skittle alley. After passing through the plate 153 the shafts 151 are bent downwards at right angles so that cranks $151^1$ are formed. To the floor of the skittle-alley is fixed the vertical frame 154. In the latter vertically movable rods 155 are provided the number of rods 155 being equal to the number of skittles. The rods 155 are guided in the cross-bars $154^1$, $154^{11}$ of the frame. To each of the rods 155 is fixed a metal tongue 156 located a short distance above the cross-bar $154^{11}$ and the lower edge of each metal tongue 156 rests upon the finger $151^{11}$ provided at the lower end of the respective crank $151^1$ the under surface of the said finger being slightly inclined. The tongues 156 are guided in the slides $153^1$ on the plate 153. The rods 155 are provided at their upper ends with semi-circular parts and with printing-types representing numerals. Below the said types the roller 157 is rotatable in the frame 154 and over the said roller the strip of paper or "tape" 158 is caused to travel.

When a number of skittles are knocked over the chains 118 attached thereto exert an upward pull on the corresponding arms $146^1$ of the bell-crank levers 146, and the shafts 151 connected with the latter by the rods 149 and levers 150 are slightly rotated so that the fingers $151^{11}$ of the respective cranks $151^1$ release the tongues 156 resting thereon, and the corresponding rods 155 descend and produce, by means of the type, impressions upon the paper 158. The latter travels from the roller 159 over the pins 160, 161 and thence over the rod 162 which, owing to its inclined position deflects the paper from a horizontal into a vertical path. From the rod 162 the paper travels over the roller 157 and then over the rod 163, the latter being so inclined that it deflects the paper from the vertical path into a horizontal path. Thereupon the paper passes between the two rollers 164, 165 and is wound up on the roller 166. The winding up of the paper on the roller 166 is effected intermittently, a certain length of the band being wound up each time a ball has been thrown and the types on the rods 155 have made impressions on the paper. For this purpose the axle of the roller 164 is provided at one end with the ratchet wheel 167 at the other end with the pulley 168. To the axle of the roller 166 there is also fixed a pulley 169, at the same level as the pulley 168, and the pulley 169 is adapted to be driven by the pulley 168 by means of the cord 170 passing over both pulleys. The ratchet wheel 167 is engaged by the pawl 171 adapted to slide in the slotted guide 172, the said pawl being pivotally connected with the free end of the single-armed lever 125. By the oscillating movement of the lever-arm 125 the pawl 171 is reciprocated and the ratchet wheel 167 is intermittently rotated.

The journals of the roller 165 are supported in slots and the springs 173, 174 bearing against the said journals press the roller 165 against the roller 164 so that the paper which passes between the said rollers is moved by the latter. As the diameter of the paper wound on the roller 166 increases the cord 170 slips on the pulley 169, the paper being uniformly fed by the rollers 164 165 whereas the roller 166 tends to wind up more paper than is fed to it by the rollers 164 165. The double-armed lever 175 fulcrumed at 176 serves to move back to their original positions the rods 155 which have descended. The arm $175^1$ of this lever 175 is provided with the cross-head 177 and the other lever-arm $175^{11}$ engages under the arm $112^{11}$ of the double-armed lever 112. When the lever-arm $112^{11}$ descends and sets up the skittles knocked over it simultaneously depresses the lever-arm $175^{11}$ and thus causes the lever-arm $175^1$ to move upwards, so that the cross-head 177 lifts the rods 155, and the tongues 156 fixed to the latter again engage the fingers $151^{11}$ of the cranks $151^1$.

In order to obtain good and legible impressions by means of the types supported by the rods 155, the ink-fountain or receptacle 179 of trapezoidal cross-section is supported above the roller 157 in the frame 154 by means of the axle 178.

An ink pad is arranged in the said receptacle 179 and to one end of the latter there is fixed the pin 180. The single armed lever 182 at the upper end of the rod 181 engages with its slotted end the pin 180. the said rod 181 being guided, like the rods 155, in the cross-bars $154^1$ $154^{11}$ of the frame 154. The rod 181 is vertically movable and its lower end is always in contact with the cross-head 177. By the movement of the double armed lever 175 the rod 181 is caused to execute an upward and downward movement and to impart, by means of the lever 182 and the pin 180, oscillation through an angle of 90 degrees to the receptacle 179, so that the ink-pad is alternately pressed against the type and removed therefrom.

The apparatus may also be provided with a device for indicating, for instance by electrical means when all skittles except the one at the center have been knocked over. An arrangement for this purpose is illustrated in Figs. 13 and 14 by way of example. Fig. 13 is a circuit-diagram including the electro-magnet 183, armature 184 and an electric battery $184^1$. Each skittle is provided with a contact device. The part $b$ (Fig. 14) of the contact device for the central skittle or so-called "King" is located above the contact bow c, whereas the parts b of the contact devices belonging to the other skittles are located below the corresponding contact-bows c. When all skittles have been set up the parts b and c belonging to the central skittle make contact with each other whereas the parts b and c belonging to the other skittles are out of contact with each other.

It is obvious from Figs. 13 and 14 that the circuit is only closed when all the skittles with the exception of the one at the center have been knocked over. When the current has been closed by this means the electromagnet 183 attracts the armature 184 which operates an automatic apparatus adapted to deliver a suitable prize.

In the example of construction illustrated a spring motor is provided but an electro-motor can also be used.

The action of the apparatus may be summarized as follows: If the winding up of the motor is to be effected without the insertion of a coin the bar 57 is moved towards the right (Fig. 4) by means of the key 185. By this means the counting device 64 is actuated and at the same time the mechanism comprising the parts 60, 61 and 39, which prevents the movement of the crank 1 is put out of action. Thereupon the crank 1 is rotated in the manner described, that is to say through 180 degrees in one direction and then through the same angle in the other direction; by this means the driving mechanism is put into action. By each double operation of the crank 1 the driving spring is wound up. It is in this case assumed that the said spring is wound up to a certain extent before the playing of the game. If the winding up of the driving spring is to be effected after the insertion of a coin the bar 57 actuates the counting device 63 and at the same time unlocks the crank 1, whereupon the driving mechanism is put into action by means of the crank.

What I claim as my invention and desire to secure by Letters Patent of the United States is:—

1. In apparatus for the purpose set forth the combination of a base, automata mounted thereon, a series of skittles mounted on said base, means for causing one of said automata to grasp and throw a ball along said base, and means for causing another of said automata to return the ball to the first mentioned automaton.

2. In apparatus for the purpose set forth the combination of a base, automata mounted thereon, a series of skittles mounted on said base, means for causing one of said automata to grasp and throw a ball along said base in the direction of the skittles means for causing another of said automata to return the ball to the first mentioned automata and means for returning the skittles knocked down to their original positions.

3. In apparatus for the purpose set forth the combination of a base, automata mounted thereon, a driving shaft, a motor adapted to operate the latter, means for starting and stopping said motor, a series of skittles mounted on said base, means operated from said driving shaft for causing one automaton to grasp and throw a ball along the base in the direction of the skittles, means for causing another automaton to return the ball to the first mentioned automaton, and means for returning the skittles knocked down to their original position.

4. In apparatus for the purpose set forth the combination of a base, automata mounted thereon, a driving shaft, a motor adapted to operate the latter, means for starting and stopping said motor, a series of skittles resiliently mounted on said base, means operated from said driving shaft for causing one automaton to grasp and throw a ball along the base towards said skittles, means for causing another automaton to return said ball to the first mentioned automaton, means for returning the skittles knocked down to their original position, means for indicating the number of skittles knocked down at each throw and means for registering the scores of the players.

5. In apparatus for the purpose set forth the combination of a base two automata mounted thereon, an inclined trough located between said automata, a series of skittles mounted on said base, means whereby one automaton is caused to grasp a ball and throw same along the base towards the skittles, means whereby the other automaton is caused to pick up the thrown ball from the base and place same in the inclined trough aforesaid, and means for returning the skittles knocked down by the ball to their original positions.

6. In apparatus for the purpose set forth the combination of a base, automata mounted thereon, a series of skittles mounted on said base, a driving shaft, a spring motor, adapted to actuate said shaft, a crank for winding said motor, means for starting and stopping the latter, means for preventing the movement of the motor during the rotation of the crank, means for preventing movement of the crank during action of the motor, means operated from the driving shaft aforesaid for causing one of said automata to grasp and throw a ball along said base and means for causing another of said automata to return the ball to the first mentioned automaton.

7. In apparatus for the purpose set forth the combination with an alley of an automaton mounted adjacent one end thereof and adapted to rotate about its vertical axis, a second automaton mounted adjacent the opposite end of the alley, an inclined trough located between said automata, a series of skittles supported by the alley, a driving shaft, cams and lever mechanisms operated by said shaft whereby the first automaton is caused to grasp a ball and throw same along the alley towards the skittles and whereby the second automaton is caused to pick up the thrown ball from the floor of the alley and place same in the inclined trough aforesaid, a plate below the alley adjacent the skittles, flexible resilient connections between the skittles and said plate and cam and lever mechanism operated by the driving shaft whereby the plate is moved to tension said connections and raise the skittles knocked down by the ball substantially as described.

8. In apparatus for the purpose set forth the combination of an alley, automata movably mounted thereon, a series of skittles located between said automata, a driving shaft, a motor adapted to operate same, means driven from said shaft for placing a ball between the hands of one automaton, means whereby said automaton is caused to grasp the ball and throw same along said alley in the direction of the skittles, means driven from said driving shaft whereby another automaton is caused to pick up the ball from the floor of the alley and return it to the first mentioned automaton, means driven from said driving shaft for returning to their original positions the skittles knocked down by the ball, means for graphically indicating the number of skittles knocked down, means for indicating when all the skittles but one have been knocked down and means for registering the scores of the players substantially as described.

In witness whereof I have signed this specification in the presence of two witnesses.

OTTO EICHENBERGER.

Witnesses:
L. H. MUNICRY,
CHS. HUMBERT.